Nov. 27, 1956 — W. A. ERNST — 2,772,079
BLENDING AGITATOR FOR SOFT PLASTIC FOODS
Filed Dec. 29, 1953
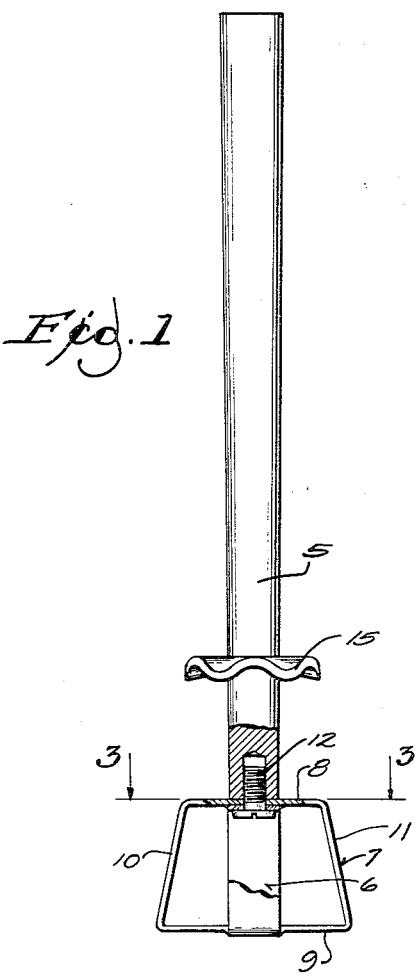
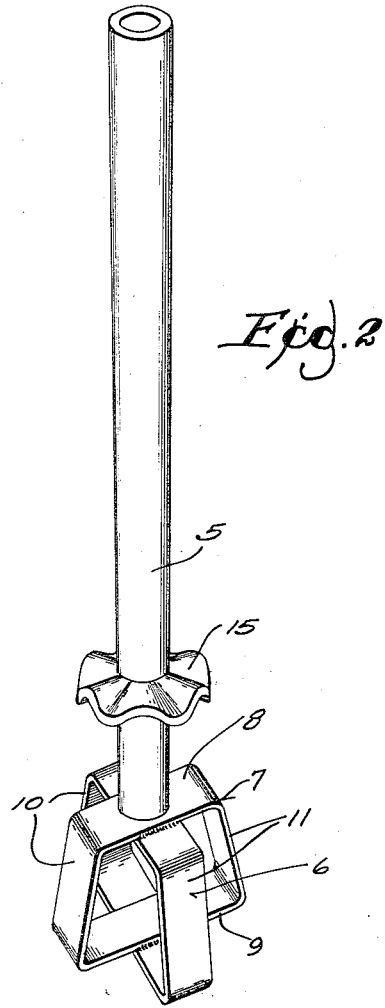
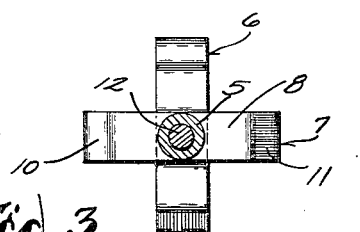
INVENTOR.
W. Arthur Ernst
BY
Wheeler, Wheeler & Wheeler
ATTORNEYS

United States Patent Office 2,772,079
Patented Nov. 27, 1956

2,772,079

BLENDING AGITATOR FOR SOFT PLASTIC FOODS

W. Arthur Ernst, Racine, Wis.

Application December 29, 1953, Serial No. 400,878

1 Claim. (Cl. 259—134)

This invention relates to a blending agitator for soft plastic frozen foods and the like.

There are special problems in the mixing of milk shakes and the like when the frozen comestible used in the beverage is a soft paste. Almost all ice cream is hard frozen. The problem in handling any such hard frozen mix is a problem of disintegrating the frozen mass as a preliminary to incorporation of the disintegrated mass in the beverage. Where the comestible is soft, the problem is altogether different. This situation is encountered in products known as custards and in other ice cream substitutes which are currently being manufactured from skim milk, with no fat.

Where the comestible is soft, the ordinary beverage mixing agitator simply creates a vortex or whirlpool, the open center of which usually reaches right into the agitator. This tends to aerate the ingredients but does not adequately mix them without an undue expenditure of time. It is the purpose of the present invention to provide an almost instant mixing by the use of an agitator construction which leaves the agitator deep in the fluid mass, with no vortex in the vicinity so that the full stream of liquid material is instantly and constantly subjected to the whipping and mixing operation of the agitator head. In practice the head as herein disclosed accomplishes the mixing function in from five to ten seconds. No competitive mixer can even approach this speed of operation because the agitators in use elsewhere are designed for the disintegration of hard ice cream and when used in a soft frozen comestible they simply open a vortex in which the agitator operates without adequate or speedy mixing operation.

The desired results are accomplished in the present device by blades which are generally tangent to a circle drawn around the axis of rotation and which converge upwardly so that the mixing head is wider at its base than at its top. Moreover, the spindle upon which the head is mounted carries a disk with a fluted periphery spaced slightly above the head and which cooperates therewith by performing the important function of intercepting and dissipating downward flow along the spindle to leave the head functioning in a solid body of plastic mix.

When the device of the present invention is lowered into the conventional beverage mix cup, in which there will usually be a liquid and a plastic semi-frozen material, the blades immediately initiate a current of material which moves outwardly in all directions from the device to the wall of the cup and thence up the cup wall to the surface of the mix and thence downwardly along the spindle. At no time is there any substantial vortex apparent, despite high speed operation of the spindle. In consequence of the regular and continuous flow of the mixture, induced by the blades and disk which operate thereon in the course of such flow, the operator need only lower the device into the cup and immediately remove it, the mixture being completed and blended within the length of time required for that operation.

In the drawings:

Fig. 1 is a view of the device in side elevation, portions being broken away.

Fig. 2 is a view of the device in perspective.

Fig. 3 is a view taken in section on the line 3—3 of Fig. 1 to show the blades in plan.

The spindle 5 carries at its lower end an agitator head comprising blades 6 and 7. Each blade comprises an endless strap in the form of a closed figure having flat and parallel top and bottom pieces 8 and 9 and upwardly convergent side faces 10 and 11. The blades cross each other at right angles as clearly appears in Figs. 2 and 3. A screw 12 passes through their lapping top surfaces to secure them to the spindle 5, it being immaterial to the present invention just how the blades are mounted to the spindle.

Immediately above the blades is a flow intercepting disk 15 which preferably has radial convolutions as shown.

While numerous changes may be made in the specific design of the device as disclosed, it is important that the agitating head shall have its base portion wider than its top portion and it is also important that an intercepting plate or disk of some form be mounted on the spindle 5 immediately above the blades. I find it desirable that the blades be substantially flat and substantially upright and I prefer that the blades, as viewed in any horizontal plane, shall have their width disposed tangentially to a radius drawn from their center lines to the axis of rotation.

The device as disclosed does an excellent job of mixing and blending when the material to be acted upon is hard, as in the case of some fruits, but particularly in the case of beverages made of hard frozen ice cream. However, unlike any competitive devices for operating successfully on hard frozen ice cream, the agitator herein disclosed is outstandingly successful in blending within a few seconds a beverage made from soft frozen and very plastic comestible mixes. In this respect it is superior to the device of my former Patent 2,637,537 although, in common with the device of that patent, it prevents the formation of a vortex such as precludes, rather than assists in a high speed blending operation.

I claim:

An agitator for a beverage mixer, said agitator comprising a spindle provided intermediate its ends with a fluid intercepting disk having radial convolutions and an agitator head mounted on the spindle below said disk and comprising a pair of endless straps each in the form of a figure having a closed perimeter and being entirely open within said perimeter, said straps crossing each other at right angles and having substantially flat and approximately parallel top and bottom portions and radially divergent blending portions, the said top portion being spaced below said disk and the said blending portions each being approximately tangential in a horizontal section through said head to a circle drawn about the projected axis of the spindle.

References Cited in the file of this patent

UNITED STATES PATENTS

| 153,322 | Dowell | July 21, 1874 |
|---|---|---|
| 1,090,148 | Harr | Mar. 17, 1914 |
| 1,141,420 | Shattuck | June 1, 1915 |
| 1,763,301 | Gilbert | June 10, 1930 |
| 2,637,537 | Ernst | May 5, 1953 |